Figure 1:
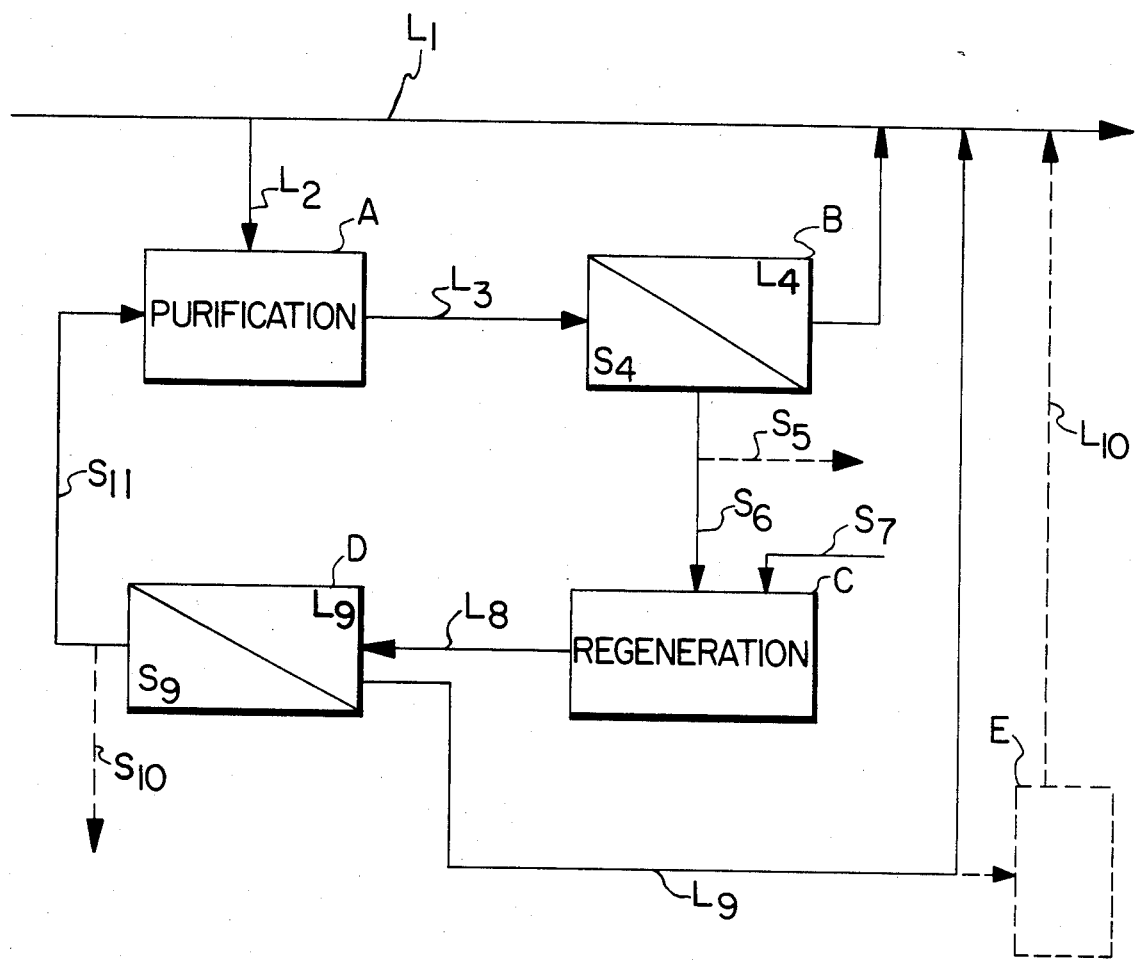

United States Patent [19]

Fabre et al.

[11] Patent Number: 4,597,952

[45] Date of Patent: Jul. 1, 1986

[54] PURIFICATION OF SOLUTIONS OF SODIUM ALUMINATE IN THE BAYER CYCLE BY THE REMOVAL OF SODIUM OXALATE

[75] Inventors: Jean Fabre; Eric Lavalou; François Nicolas, all of Aix-en-Provence, France

[73] Assignee: Aluminium Pechiney, Paris, France

[21] Appl. No.: 747,955

[22] Filed: Jun. 24, 1985

[30] Foreign Application Priority Data

Jun. 25, 1984 [FR] France ................. 84 10187
Apr. 18, 1985 [FR] France ................. 85 06283

[51] Int. Cl.$^4$ ............................................. C01F 7/06
[52] U.S. Cl. ..................................... 423/122; 423/130; 423/121
[58] Field of Search ......................... 423/121, 122, 130

[56] References Cited

U.S. PATENT DOCUMENTS

| | | | |
|---|---|---|---|
| 3,899,571 | 8/1975 | Yamada et al. | 423/127 |
| 4,101,629 | 7/1978 | Mercier et al. | 423/127 |
| 4,263,261 | 4/1981 | Yamada et al. | 423/127 |
| 4,275,042 | 6/1981 | Lever | 423/127 |
| 4,478,795 | 10/1984 | Hereda et al. | 423/127 |

FOREIGN PATENT DOCUMENTS 69439 11/1975 Australia ..................... 423/127

*Primary Examiner*—H. T. Carter
*Attorney, Agent, or Firm*—Dennison, Meserole, Pollack & Scheiner

[57] ABSTRACT

A process for purifying at least a fraction of a solution in the Bayer cycle, which is preferably taken off after decomposition of the sodium aluminate, before or after concentration thereof, by causing the precipitation of the sodium oxalate in solution by the introduction of an agent for destabilization of the state of supersaturation of the sodium oxalate, which is characterized in that the supersaturation destabilization agent introduced into the Bayer solution to cause precipitation of the sodium oxalate is selected from the group comprising calcium oxalate and barium oxalate and that, in the case of solutions charged with degraded organic materials which generally result from high-temperature attack on bauxites with high proportions of humic materials, an anionic synthetic polyelectrolyte of high molecular mass is previously introduced into said solutions in order to increase the efficiency of the purification effect.

31 Claims, 1 Drawing Figure

4,597,952

PURIFICATION OF SOLUTIONS OF SODIUM ALUMINATE IN THE BAYER CYCLE BY THE REMOVAL OF SODIUM OXALATE

TECHNICAL FIELD

The invention concerns a process for the purification of alkaline solutions preferably resulting from the decomposition of sodium aluminate from the Bayer cycle by precipitation of sodium oxalate, by virtue of the introduction of a suitable agent for causing destabilisation of the supersaturated state in which the oxalate naturally occurs.

PROBLEM SET: STATE OF THE ART

The Bayer process which is amply described in the specialist literature and which is well known to the man skilled in the art constitutes the essential procedure for the production of alumina which is intended to be converted into aluminium by igneous electrolysis. In that process, the bauxite ore is treated in the hot condition by means of an aqueous solution of sodium hydroxide, at a suitable level of concentration, thus causing solubilisation of the alumina and the production of a supersaturated solution of sodium aluminate. After separation of the solid phase constituting the residue which has not been attacked (red mud) of the ore, the supersaturated sodium aluminate solution is seeded with particles of aluminium trihydroxide in order to cause precipitation of the aluminium trihydroxide.

The sodium aluminate liquor with its reduced alumina content is recycled to the attack stage of the process after having been concentrated and recharged with sodium hydroxide to restore the level of concentration which is suitable for attacking the ore.

However, at the same time as the alumina is dissolved in the state of sodium aluminate, the supersaturated sodium aluminate solution resulting from the attack operation becomes charged with organic materials in the form of sodium salts, among which the oxalate is one of the most troublesome components.

The accumulation of such organic impurities in the sodium aluminate solution in the Bayer process gives rise to major disadvantages that the man skilled in the art has tried and is still trying to overcome.

The disadvantages which are associated in particular with the accumulation of sodium oxalate in Bayer solutions arise out of the fact that the oxalate, on reaching its critical supersaturation level, precipitates in the form of fine needles on the aluminium hydroxide seed. The fine sodium oxalate needles also act as actual seeds for the precipitation of aluminium hydroxide, by causing an increase in the number of fine particles which thus become excessively numerous to be effectively controlled during decomposition of the sodium aluminate.

The critical supersaturation threshold above which sodium oxalate precipitates spontaneously varies with the nature of the solution. The threshold rises in proportion to the content in the solution of organic materials which have not suffered degradation.

That phenomenon is amply described by G Lever in 'Some aspects of the chemistry of bauxite organic on the Bayer process: the sodium oxalate humate interaction. ICSOBA—1983'. It is particularly apparent in the operation of attacking bauxites which have a high content of humic materials, at high temperature ($t > 200°$ C.), wherein the proportion of oxalate increases rapidly as a result of degradation of the organic materials but the critical supersaturation threshold is relatively low by virtue of the very fact of degradation of those organic materials.

The above-indicated sodium oxalate precipitation phenomenon affects the physico-chemical qualities of the precipitated aluminium hydroxide and results for example in wide variations in the grain size of the alumina produced or increased fragility in respect of the grains of alumina, which may represent major disadvantages in regard to using the alumina in the production of aluminium by an electrolysis process.

Hence, it is found to be necessary in operations for the production of alumina on an industrial scale, to control or better to avoid contamination of the aluminium trihydroxide seed during the decomposition stage, by precipitated sodium oxalate.

A first process with which the man skilled in the art is familiar comprises using lime to treat the liquor for washing the aluminium trihydroxide which is produced in the Bayer cycle, in order to precipitate the oxalate present in the form of the calcium salt and to remove it from the production cycle while the washing liquor with a reduced oxalate content is recycled.

An alternative form of that process which is well known to the man skilled in the art further comprises washing a part of the aluminium trihydroxide seed and treating the liquor for washing said seed with lime.

Such processes only make it possible to limit the degree of contamination with sodium oxalate and were satisfactory from the point of view of the man skilled in the art as long as the alumina required for the electrolysis operation and produced in accordance with those processes was of a plastery nature.

However, development in the technology of electrolysis tanks today requires a sandy alumina, of regular grain size and with good mechanical strength, all those being qualities that the man skilled in the art knows are difficult to attain by way of the above-mentioned treatment processes.

In order to arrive at such qualities, it is desirable to prevent precipitation of sodium oxalate on the aluminium trihydroxide seed. It then becomes essential to maintain the concentration of sodium oxalate in the sodium aluminate solution upon decomposition, at a value which is lower than its critical supersaturation concentration.

Various processes have been proposed for limiting, in the Bayer cycle, the amount of sodium oxalate dissolved in the Bayer solutions.

A process which is disclosed in U.S. Pat. No. 3,899,571 and European Pat. No. 0 013 407 comprises treating a Bayer solution which is supersaturated with respect to solubility in the equilibrium condition of sodium oxalate (such as the solutions with a reduced sodium aluminate concentration which come from the decomposition step and which may or may not be reconcentrated), by introducing a recycled sodium oxalate seed to cause precipitation of the sodium oxalate in solution and to give rise to the concentration of solubility equilibrium in respect of anhydrous sodium oxalate.

After a solid-liquid separation step, the purified solution is then re-introduced into the Bayer cycle while a fraction of the solid sodium oxalate phase is used for preparing the suspension of seed crystals, the other fraction being removed from the cycle.

Although that process affords attractive ways of providing for precipitation of sodium oxalate by seeding, it does however suffer from disadvantages which give rise to difficulties when it is carried out on an industrial scale.

In fact, the sodium oxalate crystals forming the seeding agent fairly rapidly become inactive due to poisoning of their surface by the organic materials present. More than that, the organic materials present require a washing operation, which is difficult to carry out, for the sodium oxalate crystals. For, when the washing effect is found to be inadequate, it is found that there is a drop in activity of the seed and hence a fall in the sodium oxalate precipitation yield. If the washing operation is taken to an excessive degree, it results in the seed experiencing a reduction in grain size, which results in difficulties in liquid-solid separation operations and hence reductions in the level of efficiency in regard to purification.

Another process for limiting the amount of sodium oxalate in the Bayer solutions, which is disclosed in French Pat. No. FR-A-2 317 226 and U.S. Pat. No. 4,038,039 consists of using evaporation to concentrate a part of the solution resulting from the decomposition of sodium aluminate, in order to make it supersaturated in respect of sodium oxalate, then breaking the supersaturation by spraying the concentrated and cooled solution in the form of fine droplets on to a bed of steel turnings, destabilisation of the supersaturation condition being caused by the mechanical shock of the droplets on the steel turnings and rapid evaporation of the liquid phase, as a consequence of the high ratio as between the surface area of the droplets and the volume thereof.

However, such a process which has a very short residence time requires the provision of a substantial amount of solution to be treated. That solution which must be concentrated by evaporation is then cooled (at from 10° to 15° C.) before being sprayed on to the steel turnings. Thus, the process first requires the use of a specific technology but more particularly it is found to consume a large amount of energy, firstly for concentrating the solution to be treated, by evaporation, and then for cooling the solution before it is sprayed on to the metal turnings.

Finally, another proceess for limiting the amount of sodium oxalate in Bayer solutions, which is disclosed in U.S. Pat. Nos. 4,275,043 and 4,275,042, comprises causing precipitation of the sodium oxalate by selective adsorption on activated carbon or by a cationic sequestering agent, from the organic materials which are responsible for the stability of the sodium oxalate supersaturation. Then, after a solid-liquid separation step, the solution with its reduced sodium oxalate content is reintroduced into the Bayer cycle while the precipitated oxalate is extracted from the circuit at the same time as the activated carbon, which latter may be subsequently regenerated by a heat treatment. However, the process as described does not afford the full effectiveness that could have been expected to such a degree that it is recommended that the action thereof should be completed by introducing a sodium oxalate seeding agent.

Thus, although they may appear to be attractive propositions, the prior processes suffer from disadvantages which may be serious, since the man skilled in the art wishes in the Bayer cycle to limit the amount of sodium oxalate dissolved in the solutions, for the above-indicated reasons.

It is for that reason that the applicants found and developed a process for the purification of alkaline solutions preferably resulting from the decomposition of sodium aluminate in the Bayer cycle, in order controlledly to limit the amount of sodium oxalate in the aluminium trihydroxide production solution.

SUBJECT OF THE INVENTION AND PERFORMANCE THEREOF

The process according to the invention which comprises treating all or part of a solution in the Bayer cycle, preferably after decomposition of the sodium aluminate, before or after concentration thereof, by an agent for destabilisation of the state of supersaturation of the sodium oxalate in a dissolved condition is characterised in that the destabilisation agent for causing precipitation of the sodium oxalate is selected from the group comprising calcium oxalate and barium oxalate and that in the case of solutions which are charged with degraded organic materials generally resulting from the high-temperature attack on bauxites with high proportions of humic materials, an anionic synthesis polyelectrolyte with a high molecular mass is previously introduced into said solutions at any point in the Bayer cycle.

According to the invention, the destabilisation agent which is formed by calcium or barium oxalate is added to at least a part of the sodium aluminate solution preferably resulting from the decomposition operation, prior to or after concentration thereof. The calcium or barium oxalate, being unstable under those conditions, liberates the oxalate ion. That results in an increase in the concentration of sodium oxalate such that the critical supersaturation threshold in the solution is exceeded and the sodium oxalate precipitates spontaneously, partially entraining therewith organic materials which are responsible for its initial state of supersaturation.

A part of the precipitated oxalate is recycled to the purification step by means of a particular procedure because, by virtue of the organic materials present, the precipitated oxalate cannot be recycled as it is. In fact, dissolution of all or part of the precipitated oxalate containing the organic materials would result in an increase in the critical threshold in respect of oxalate supersaturation in the solution to be purified.

Since separation of the organic materials from the precipitated oxalate is necessary before any recycling operation, the latter is carried out by at least partially putting the precipitated sodium oxalate back into aqueous solution and treating the suspension produced by means of lime (CaO) or barium aluminate ($Al_2O_4Ba$). That treatment results in the production of a calcium oxalate or barium oxalate precipitate which, freed of the organic materials by solid-liquid separation, is recycled to the step for precipitation of the sodium oxalate.

Still in accordance with the invention, the purified solution, after separation of the solid phase, is re-introduced into the Bayer circuit. Its residual sodium oxalate content corresponds to the limit of solubility of sodium oxalate under the conditions of the experiment, referred to as apparent solubility. The difference between the critical supersaturation threshold and the apparent solubility of sodium oxalate in the sodium aluminate solution reveals the magnitude and therefore the efficiency of the purification effect.

It follows from that observation that, the higher the critical supersaturation threshold, the better is the degree of purification of the solution, in respect of sodium oxalate. Thus, in the particular case of Bayer liquors with substantial contents of degraded organic materials, generally resulting from treatments for attacking bauxite at high temperature, which are characterised by a critical supersaturation threshold which is little different from the apparent solubility limit, the degree of purification in respect of oxalate is then low, which limits the economic attraction of the process, having regard to the substantial volumes of solutions to be treated.

Bearing those observations in mind, the applicants, continuing their research in an effort to enhance the efficiency of the process according to the invention in its use in particular for treating bauxites at high temperature, found that it was possible to raise the critical supersaturation threshold of sodium oxalate by the previous addition to the sodium aluminate solution, at any stage in the Bayer cycle but preferably before the aluminium trihydroxide precipitation stage, of an anionic synthetic polyelectrolyte with a molecular mass of $M > 10^4$ grams per mole, the unexpected property of which is to act as a substitute on a long-term basis as a stabilising agent for the natural organic materials or, in the absence thereof, in the solution.

The anionic polyelectrolyte is selected from the group comprising polyacrylic acids, polyacrylamides, sodium polystyrene sulphonates, and sodium polyacrylate and polyacrylamide copolymers. Widely used as flocculating agents, such organic synthetic compounds are also known for their properties in regard to stabilising sodium oxalate in the Bayer solution (the above-quoted communication by Gordon Lever ICSOBA) in the same respect as the humic materials conained in bauxites. However, as the man skilled in the art is well aware, such humic materials rapidly suffer degradation in the high-temperature attack cycle so that their stabilising action in regard to sodium oxalate supersaturation in the solutions resulting from such treatments is very slight. Now, in many experiments carried out by the present applicants, by the addition of those various flocculating agents in various proportions to the Bayer solution, it was surprisingly found that, in proportions by weight of between $5.10^{-5}$ and $10^{-3}$, reckoned with respect to the weight of caustic $Na_2O$ in the Bayer solution, such flocculating agents had a regular and long-term stabilising effect. Thus, the applicants observed increases of 500 to 800% in the level of purification efficiency, as measured by the difference between the critical supersaturation threshold and the apparent solubility limit; that level of purification efficiency was maintained without the fresh addition of stabilising agent over several tens of attack cycles, irrespective of the level of concentration of caustic $Na_2O$ and the temperature of the attack liquor in the ranges which are usually employed in the Bayer cycle (caustic $Na_2O$: 100 to 250 g/liter; temperature: 100° to 290° C.).

The small amounts of flocculating agents used with respect to the volumes of liquor being treated, and the possibility of adding flocculating agent to the Bayer solution without any particular preparation are likewise factors which make the improvement very easy to carry into effect when it is necessary for it to be previously applied to the treatment for purification of the Bayer solutions.

The above-mentioned treatment for the purification of the Bayer solutions preferably resulting from decomposition of sodium aluminate is carried out before or after the concentration step at the temperature of the solution itself, or after cooling.

Thus, and generally, the temperature at which the purification treatment is carried out is selected to fall in the range of from 20° to 80° C. and preferably in the range of from 50° to 70° C.

The amount of sodium oxalate supersaturation destabilisation agent introduced into the Bayer solution to be treated to cause precipitation of the sodium oxalate, expressed in the anhydrous form of calcium or barium oxalate, is generally between 0.5 and 15 g/l and preferably between 1.0 and 5.0 g/l when the agent is calcium oxalate, and generally between 0.5 and 25 g/l and preferably between 1 and 10 g/l, when the agent is barium oxalate.

After precipitation of the sodium oxalate present in at least a fraction of the Bayer solution which is preferably taken off after decomposition of the sodium aluminate, by the introduction of calcium or barium oxalate, and then solid-liquid separation, permitting the purified solution to be re-introduced into the Bayer cycle, the solid phase which is separated off in that way, in regard to at least a fraction thereof, is subjected to at least partial dissolution in water when the destabilisation agent is calcium oxalate and in an alkaline solution when the destabilisation agent is barium oxalate. The re-dissolution operation is carried out at a temperature which is at most equal to boiling temperature and preferably between 70° and 90° C.

When the destabilisation agent is calcium oxalate, the latter is produced by reacting the precipitated sodium oxalate with a limewash, prepared in water. The volume of limewash used in this step is generally between 50 and 500 liters and preferably between 100 and 200 liters per tonne of alumina produced.

When the destabilisation agent is barium oxalate, the latter is produced by reacting barium aluminate on the precipitated sodium oxalate, in the presence of a washing liquor taken from the Bayer cycle and with an $Na_2O$ concentration which is generally between 20 and 80 g/l. The volume of liquor used in that step is generally between 50 and 500 liters and is preferably between 100 and 200 liters per tonne of alumina produced.

The amounts of $CaO$ or $Al_2O_4Ba$ which are selected to fall in the above-mentioned ranges of concentration, being used for the preparation of the destabilisation agent, are such as to ensure both formation of the destabilisation agent and precipitation of the carbonate present in the liquor impregnating the precipitated sodium oxalate cake, as well as the carbonate present in the washing liquor which is taken from the Bayer cycle when the destabilisation agent is barium oxalate.

The resulting calcium oxalate or barium oxalate suspension is then subjected to a solid-liquid separation operation. The solid calcium or barium oxalate phase, in all or part thereof, constitutes the agent for destabilisation of the supersaturated state of the sodium oxalate present in the solution in the Bayer cycle which is to be purified in respect of oxalate, said solution having been taken off after decomposition of the sodium aluminate.

The liquid phase containing the organic materials is re-introduced into the Bayer cycle when the destabilisation agent is calcium oxalate, or else it is purified by barium ions by a method known to the man skilled in the art such as for example in accordance with French No. 2 328 660, before being introduced into the Bayer cycle, when the destabilisation agent is barium oxalate.

The invention will be better appreciated by reference to the numbered description of a general layout of the treatment according to the invention.

In the drawing, the Bayer liquor or solution L1 which preferably comes from the zone for decomposition of the sodium aluminate solution, which has a reduced alumina content, which is supersaturated in respect of sodium oxalate, and which returns to the operation for attack on the bauxite ore, has a fraction L2 taken therefrom, prior to or after concentration thereof, with the fraction L2 being intended to be subjected to the treatment according to the invention.

The fraction L2 which is taken off in that way is introduced into the purification zone A, and likewise with the solid fraction S11 which is partially formed by recycled calcium oxalate or barium oxalate.

The purification treatment in the zone A is carried out with agitation and in the above-mentioned range of temperatures. The resulting suspension L3 is subjected to solid-liquid separation in B. The purified liquor or solution L4 which comes out of the operation B is recycled to the circuit of the Bayer solution L1.

The solid phase S4 is formed in regard to a fraction thereof by sodium oxalate which is precipitated in the zone A, and in regard to the other fraction thereof, by hexahydrated tricalcium aluminate when using calcium oxalate or barium carbonate when using barium oxalate as the destabilisation agent.

When the destabilisation agent used in calcium oxalate, the solid phase S4 is partially extracted from the cycle as indicated by S5, thus forming the discharge for the oxalate which is removed from the Bayer cycle, while the remaining part S6 is introduced into the zone C where it is treated by means of lime which is itself introduced at S7 in the form of a limewash.

The sodium oxalate forming a part of S6 is thus converted into calcium oxalate.

The suspension L8 resulting from the above-indicated treatment is subjected to solid-liquid separation in D, the liquid phase L9 being recycled to the Bayer circuit L1 while the solid phase S9 constituting the agent for destabilisation of the sodium oxalate supersaturated condition in the liquor L2 is introduced into the zone A at S11.

When the destabilisation agent used is barium oxalate, the whole of the solid phase S4 is introduced at S6 into the zone C where it is treated with barium aluminate which is introduced at S7 with a dilute $Na_2O$ solution.

The sodium oxalate which forms a part of S6 is converted into barium oxalate. The suspension L8 resulting from the treatment is subjected to solid-liquid separation at D. The liquid phase L9 containing the stabilising organic materials is then passed into the zone E where it is subjected to an operation for removal of the barium ions, using any process which is known to the man skilled in the art.

A fraction of the solid phase S9 is extracted at S10 and forms the discharge for the oxalate which is removed from the Bayer cycle. The fraction S10 is roasted with a make-up amount of alumina in accordance with the process described in French Pat. No. 2 328 660 in order to regenerate the barium aluminate and to remove the oxalate in the form of carbon dioxide $CO_2$.

The other fraction of the solid phase S9 which forms the agent for destabilisation of the sodium oxalate supersaturation in the liquor L2 is introduced at S11 into the zone A for purifying that liquor.

In practice, the process according to the invention may also occur in the form of a stepwise process comprising:

(a) taking off, preferably downstream of the decomposition zone of the Bayer cycle, a fraction of a solution which has a reduced alumina content and which is supersaturated in respect of sodium oxalate and which is possibly stabilised by the addition of a synthetic anionic polyelectrolyte;

(b) said fraction of solution is treated in a purification zone by means of calcium oxalate or barium oxalate, being an agent for destabilisation of sodium oxalate supersaturation in said fraction in order to cause precipitation of said sodium oxalate;

(c) subjecting the suspension from the purification zone to solid-liquid separation, with the liquid phase being recycled to the Bayer circuit;

(d) treating the solid phase resulting from the separation operation (C), to regenerate the solid phase:

(d1) in part with a limewash when the destabilisation agent is calcium oxalate, the other part being extracted from the treatment circuit thus forming the discharge for the oxalate which is removed from the Bayer circuit, (d2) in its entirety, with barium aluminate in the presence of a dilute $Na_2O$ solution when the destabilisation agent is barium oxalate;

(e) subjecting the suspension from the regeneration step (D) to solid-liquid separation, the solid phase is:

(e1) in its entirety introduced into the purification zone corresponding to the step (B) when the destabilisation agent is calcium oxalate, (e2) in part introduced into the purification zone corresponding to step (B) when the destabilisation agent is barium oxalate, the other part being removed from the treatment circuit to form the discharge for the oxalate which is removed from the Bayer circuit, and wherein (f) the liquid phase from step (D):

(f1) is recycled to the Bayer circuit when the destabilisation agent is calcium oxide, (f2) containing the stabilising organic materials is subjected to purification in respect of barium ions before being introduced into the Bayer cycle.

EXAMPLE 1 (illustrated by the drawing)

An industrial liquor or solution L2 with a low sodium aluminate content and supersaturated in respect of sodium oxalate, resulting from treatment of a tropical bauxite by the Bayer process, was treated in accordance with the process of the invention.

The solution L2 which was taken off from the Bayer cycle L1 was of the following composition:

Caustic $Na_2O$: 200 g/l
Carbonated $Na_2O$: 25 g/l
$Al_2O_3$: 120 g/l
Organic carbon expressed as C: 7.2 g/l
Sodium oxalate expressed as C: 0.7 g/l 1000 milliliters of the solution L2 was placed in a reactor A and held at a constant temperature of 60° C. 3.2 g of calcium oxalate S11, being the sodium oxalate supersaturation destabilisation agent, was added to the above-mentioned solution. The mixture was agitated for 4 hours.

At the end of the treatment in A, the suspension L3 was subjected to solid-liquid separation of the phases in B.

Analysis of the liquid phase L4 which is separated off gave an oxalic carbon content of 0.4 g/l.

The phase S4 forming the filtration cake which contains the hexahydrated tricalcium aluminate formed in the course of the calcium oxalate decomposition reaction in the solution treated, as well as the precipitated sodium oxalate, was separated into two fractions S5 and S6.

The fraction S5 which corresponded to the amount of sodium oxalate removed and which represented about 30 to 35% of the total mass of the cake was eliminated.

The fraction S6 was taken up and subjected to treatment in the regeneration zone C by means of 150 milliliters of a limewash containing 17 g/l of CaO. The medium which is formed in that way was maintained in an agitated condition at 80° C. for two hours in order to convert the sodium oxalate of the fraction S6 into calcium oxalate.

At the discharge of the regeneration zone C, the suspension was subjected to solid-liquid separation.

The liquor L9 from which oxalate had been removed was then suitable for recycling to L1 and the solid phase S9 was recycled to the purification zone A.

Recycling of the solid phase S9 to A was repeated on five occasions, using pure calcium oxalate on the first occasion and calcium oxalate produced in the regeneration step C on the other four occasions.

One each occasion that the precipitate S9 was recycled to A, a fresh 1000 milliliters of the above-mentioned solution L2 was treated.

At the end of the five successive purification operations, the amounts of oxalic carbon removed were as follows:

1st purification cycle: 0.30 g/l
2nd purification cycle: 0.28 g/l
3rd purification cycle: 0.31 g/l
4th purification cycle: 0.29 g/l
5th purification cycle: 0.30 g/l By way of comparison, treatment was carried out on 1000 milliliters of the same industrial solution L2 which was supersaturated in respect of sodium oxalate and with a reduced sodium aluminate content, using an aqueous solution which was saturated in respect of sodium oxalate. 3.35 g/l of sodium oxalate was introduced into the industrial solution L2.

The amount of sodium oxalate removed in zone A and separated from the liquid phase L4 in B was then 0.29 g/l.

After elimination of the solid fraction S5 corresponding to the amount of sodium oxalate removed, the fraction S6 was dissolved in water and the aqueous solution of sodium oxalate produced in that way was recycled to the zone A for fresh treatment of the industrial solution L2. The amount of oxalic carbon removed was only 0.11 g/l whereas in accordance with the invention, the amount of oxalic carbon removed in the zone A varied within the range of from 0.28 to 0.31 g/l.

EXAMPLE 2 (illustrated in the drawing)

This Example comprises treating by means of the process according to the invention the same solution L2 which is supersaturated in respect of sodium oxalate but which has a reduced sodium aluminate content, by means of 3.2 g/l of calcium oxalate which is added to the solution to be treated.

Three tests were carried out, each using a particular temperature for the purification treatment in the zone A (the temperatures were 50° C., 60° C. and 70° C.), while following the same procedure as that set forth in Example 1, in regard to the other parameters.

For each test, measurements were taken in regard to the amount in grams per liter of oxalic carbon removed in the purification zone A and subjected to physical separation in B.

All the results are set out in the following Table:

| Temperature in °C. | 50 | 60 | 70 |
|---|---|---|---|
| Oxalic carbon removed in g/liter | 0.33 | 0.30 | 0.26 |

EXAMPLE 3

This Example provides for treating in accordance with the process of the invention an industrial solution L2 which has a low sodium aluminate content and which is supersaturated in respect of sodium oxalate, resulting from high-temperature attack on a Mediterranean bauxite using the Bayer process.

The composition of the industrial solution L2 was as follows:

Caustic $Na_2O$: 200 g/l
Carbonated $Na_2O$: 22 g/l
$Al_2O_3$: 120 g/l
Organic carbon expressed as C: 5 g/l
Sodium oxalate expressed as C: 0.42 g/l
Critical sodium oxalate supersaturation threshold expressed as C: 0.45 g/l 10.7 g of calcium oxalate was added to 1000 milliliters of the above-indicated solution, with the mixture being maintained in an agitated condition at 60° C. for 6 hours.

At the end of the treatment, the suspension produced was filtered and the liquid phase L4 then titrated 0.38 g/l of oxalic carbon, which, with respect to the initial composition, gives a removal by precipitation of 0.04 g/l of oxalic carbon.

By way of comparison, an anionic polyelectrolyte (trade mark Floerger type AN 934 SH) was added to the same solution L2 in three separate tests:

(a) at a rate of 10 mg/l, that is to say 50 ppm, in relation to the weight of caustic $Na_2O$. The critical sodium oxalate supersaturation threshold of the solution expressed in respect of oxalic carbon has gone from 0.45 to 0.67 g/l. After adjustment of the concentration of oxalic carbon to 0.63 g/l, by dissolution of sodium oxalate, the solution L2 was subjected to the treatment with calcium oxalate under the conditions described hereinbefore. At the end, the suspension was filtered and the liquid phase L4 contained 0.39 g/l of oxalic carbon, giving removal by precipitation of 0.24 g/l of oxalic carbon with respect to the composition adjusted to 0.63 g/l of oxalic carbon;

(b) at a rate of 20 mg/l, that is to say 100 ppm, with respect to the weight of caustic $Na_2O$. The critical sodium oxalate supersaturation threshold of the solution expressed in respect of oxalic carbon has gone from 0.45 to 0.75 g/l. After adjustment of the concentration of oxalic carbon to 0.70 g/l by dissolution of sodium oxalate, the solution was subjected to the same treatment as before, which resulted in the removal by precipitation of 0.28 g/l of oxalic carbon;

(c) at a rate of 60 mg/l, that is to say, 300 ppm, with respect to the weight of caustic $Na_2O$. The critical sodium oxalate supersaturation threshold of the solution expressed in respect of oxalic carbon has gone from 0.45 to 0.82 g/l. After adjustment of the concentration of oxalic carbon to 0.79 g/l by the dissolution of sodium oxalate, the solution was subjected to the same treatment as before, which resulted in purification by precipitation of 0.36 g/l of oxalic carbon.

Thus, in the three comparative tests described above, the level of efficiency of the purification operation was increased by 500, 600 and 800% respectively with respect to the reference test.

EXAMPLE 4

Taking an industrial solution or liquor L2 of the same origin and of identical composition to that of Example 3, added thereto was 20 mg/l of the same polyelectrolyte (trade mark Floerger type AN 934 SH). The solution was then raised to a temperature of 245° C. for 8, 24, 48 and 72 hours. At the end of each residence time, its critical sodium oxalate supersaturation threshold was determined and a purification test was carried out in accordance with the procedure described in Example Ib.

The results are set out in the following Table:

| Residence time at 245° C. (hours) | 8 | 24 | 48 | 72 |
|---|---|---|---|---|
| Critical sodium oxalate supersaturation threshold expressed as C (g/l) | 0.74 | 0.77 | 0.75 | 0.76 |
| Oxalic carbon removed in g/l | 0.27 | 0.28 | 0.29 | 0.28 |

The Table shows an excellent degree of stability of the critical sodium oxalate supersaturation threshold which confirms, in spite of the elevated attack temperature, the efficiency of the flocculating agent in respect of time.

EXAMPLE 5 (illustrated in the drawing)

1000 milliliters of the industrial solution L2 of Example 1 was treated in A, in accordance with the invention, using 5.6 g of barium oxalate. The corresponding medium was maintained in an agitated condition for 4 hours at a temperature of 60° C.

The suspension L3 from A was filtered. The filtrate L4 had a content of 0.39 g/l of oxalic carbon.

The cake S4 was diluted again in the regeneration zone C in 70 milliliters of a dilute aqueous solution from the Bayer cycle, containing 40 g/l of caustic $Na_2O$. Added thereto was 13.2 g of barium aluminate (containing 40.5% of BaO), then the suspension was held in an agitated condition at 80° C. for 1 hour.

At the end of a separation operation in D, the solid fraction S10 of the cake S9 corresponded to the amount of sodium oxalate removed, representing about 34% of the total mass of the solid discharged from the treatment cycle.

The other solid fraction S11 was recycled to the zone A, to constitute the agent for destabilisation of the oxalate supersaturated condition in the purification of a fresh amount (1000 milliliters) of solution L2.

Five successive purification operations were thus carried out on five portions of solution L2.

The amounts of oxalic carbon removed were expressed in grams per liter of treated solution L2:

1st purification cycle: 0.30 g/l
2nd purification cycle: 0.31 g/l
3rd purification cycle: 0.29 g/l
4th purification cycle: 0.30 g/l
5th purification cycle: 0.31 g/l

EXAMPLE 6 (illustrated in the drawing)

An industrial solution with a low sodium aluminate content and supersaturated in respect of sodium oxalate, resulting from the treatment of an Australian bauxite by the Bayer process, was treated by the process according to the invention.

The solution L2 taken off was of the following composition:

Caustic $Na_2O$: 152 g/l
Carbonated $Na_2O$: 44 g/l
$Al_2O_3$: 91 g/l
Oxalic carbon expressed as C: 42.5 g/l
Sodium oxalate expressed as C: 1.03 g/l.

1.6 g of calcium oxalate was added in A to 1000 milliliters of that solution. The mixture was maintained in an agitated condition at 60° C. for 4 hours.

At the end of the treatment in A and after separation by filtration in B, the oxalic carbon content of the filtrate L4 was 0.51 g/l.

As in Examples 1 and 3, the cake S4 from B was separated into two fractions S5 and S6:

the fraction S5 representing about 60% of the total mass of S4 formed the amount of sodium oxalate removed from the treatment cycle in accordance with the invention, and the fraction S6 was dissolved in C with 130 milliliters of a limewash containing 15 g/l of CaO (agitation for 2 hours at 80° C) permitting the sodium oxalate to be converted into calcium oxalate.

After separation in D, the solid fraction S9 was recycled to A as indicated at S11 to effect purification of a fresh fraction of 1000 milliliters of the solution L2.

Five purification operations were carried out in succession using the above-indicated process on five portions of the solution L2 with recycling of the destabilising agent from the preceding operation.

At the end of the five successive purification operations, the amounts of oxalic carbon removed for 1000 milliliters of solution treated were as follows:

1st purification cycle: 0.52 g/l
2nd purification cycle: 0.52 g/l
3rd purification cycle: 0.50 g/l
4th purification cycle: 0.53 g/l
5th purification cycle: 0.51 g/l.

EXAMPLE 7 (illustrated in the drawing)

The process according to the invention was tested for a period of 3 months on a continuously operating industrial pilot plant, the mean operating conditions of which are set out below:

An agitated reactor A, with a total volume of 500 liters, was fed:

on the one hand with 50 liters/hour of an industrial solution L2 of the following composition:

Caustic $Na_2O$: 201.8 g/l
Carbonated $Na_2O$: 26.6 g/l
$Al_2O_3$: 120 g/l
Sodium oxalate expressed as C: 0.74 g/l on the other hand, with 630 grams/hour of an impregnated solid resulting from the recycling treatment of the sodium oxalate precipitate and containing about 34% in dry matter of calcium oxalate.

The temperature of the reactor A was regulated to 60° C. by circulating a heat exchange fluid in a double jacket.

The mean residence time of the solution was about 6 hours.

The suspension from A was conveyed by a pump to the filter B which was thus fed with a solution containing 15 to 20 g/l of dry matter.

The solution L4 issuing from the filter B contained:
Caustic $Na_2O$: 200.5 g/l
Carbonated $Na_2O$: 27.2 g/l
Sodium oxalate expressed as C: 0.41 g/l.

The rate by weight of the cake S4 from the filtration operation B was of the order of 1000 to 1200 g per hour. The cake S4 was separated into two fractions S5 and S6:

the fraction S5 forming the amount of sodium oxalate removed from the treatment cycle represented 280 g/hour to 480 g/hour, and the fraction S6 representing about 720 g/hour of impregnated cake was introduced into an agitated reactor C with a useful volume of 50 liters, the temperature in which was regulated to 80° C., simultaneously with 15 l/hour of a limewash containing 4 g/l of CaO.

After a residence time of 2 hours, the overflowing suspension L8 was subjected to solid-liquid separation in D. The solid fraction S9 formed the destabilisation agent (calcium oxalate) which is recycled to the purification step A as S11.

Thus, in accordance with the process of the invention, when applied continuously to a Bayer solution, it was possible to extract about 1.8 kg of sodium oxalate (that is, 0.32 kg of oxalic carbon) by treating only 1000 liters of the solution L2, being a level of performance which is sufficient on an industrial scale to avoid any precipitation of sodium oxalate on the aluminium trihydroxide seed in the course of crystallisation of the aluminium trihydroxide.

We claim:

1. In the Bayer cycle, wherein bauxite ore is treated with an aqueous sodium hydroxide solution to solubilize the alumina producing a supersaturated sodium aluminate solution and a solid phase of red mud, the red mud is separated from the sodium aluminate solution, the sodium aluminate solution is seeded with aluminum trihydroxide particles to cause precipitation of aluminum trihydroxide from the solution, and the solution is recycled for further treatment of bauxite ore, the improvement comprising a process for purifying at least a fraction of said solution from which aluminum trihydroxide has been precipitated, comprising the steps of:

(a) introducing into said at least a fraction, a supersaturation destabilization agent selected from the group consisting of calcium oxalate and barium oxalate, thereby causing precipitation of sodium oxalate;

(b) separating said precipitated sodium oxalate from said at least a fraction; and (c) recycling said at least a fraction from which said sodium oxalate has been separated, for further treatment of said bauxite ore.

2. In a process for purifying at least a fraction of a solution in the Bayer cycle according to claim 1, wherein said bauxite ore contains a high proportion of humic material resulting in an aluminate solution charged with degraded organic materials, the additional improvement comprising adding to said aluminate solution at any point in said Bayer cycle, an anionic synthetic polyelectrolyte selected from the group consisting of polyacrylic acids, polyacrylamides, sodium polystyrene sulphonates, and sodium polyacrylate and polyacrylamide copolymers.

3. A process for purifying at least a fraction of a solution in the Bayer cycle according to claim 1 or 2 characterised in that the temperature at which the Bayer solution purification treatment is carried out is between 20° and 80° C.

4. A process for purifying at least a fraction of a solution in the Bayer cycle according to claim 1 or claim 2 characterised in that the amount of sodium oxalate destabilisation agent introduced into the Bayer solution to be treated is between 0.5 and 15 g/l and the agent is calcium oxalate.

5. A process for purifying at least a fraction of a solution in the Bayer cycle according to claim 4, wherein the amount of sodium oxalate destabilization agent introduced into the Bayer solution to be treated is between 1.0 and 5.9 g/l.

6. A process for purifying at least a fraction of a solution in the Bayer cycle according to claim 1 or claim 2 characterised in that the amount of sodium oxalate supersaturation destabilisation agent is between 0.5 and 25 g/l and the agent is barium oxalate.

7. A process for purifying at least a fraction of a solution in the Bayer cycle according to claim 6, wherein the amount of sodium oxalate supersaturation destabilization agent is between 1 and 10 g/l.

8. A process for purifying at least a fraction of a solution in the Bayer cycle according to any one of claims 1 or 2 characterised in that a part of the solid phase containing sodium oxalate, which is produced by the introduction of the destabilisation agent, is subjected to at least partial dissolution in water and then treated with a limewash to produce calcium oxalate, the other part of the solid phase constituting the discharge of the oxalate from the Bayer cycle.

9. A process for purifying at least a fraction of a solution in the Bayer cycle according to claim 8 characterised in that the temperature of dissolution of the sodium oxalate is at most equal to the boiling temperature.

10. A process for purifying at least a fraction of a solution in the Bayer cycle according to claim 8 characterised in that the volume of the water or the alkaline solution for dissolving the solid phase containing the precipitated sodium oxalate is from 50 to 500 liters.

11. A process for purifying at least a fraction of a solution in the Bayer cycle according to claim 8 characterised in that the sodium oxalate which is precipitated in the form of calcium oxalate constitutes the supersaturation destabilisation agent which is recycled to a fraction of Bayer solution to be purified.

12. A process for purifying at least a fraction of a solution in the Bayer cycle according to claim 8, wherein the temperature of dissolution of the sodium oxalate is from 70° to 90° C.

13. A process for purifying at least a fraction of a solution in the Bayer cycle according to claim 8, wherein the volume of the water or alkaline solution for dissolving the solid phase containing the precipitated sodium oxalate is from 100 to 200 liters per tonne of alumina produced.

14. A process for purifying at least a fraction of a solution in the Bayer cycle according to any one of claims 1 or 2 characterised in that the solid phase containing the sodium oxalate, which is produced by the introduction of the destabilisation agent, is subjected to at least partial dissolution in an alkaline solution and then treated with barium aluminate to produce barium oxalate.

15. A process for purifying at least a fraction of a solution in the Bayer cycle according to claim 14 characterised in that the alkaline solution for at least partial dissolution of the precipitated sodium oxalate contains from 20 to 80 g/l of $Na_2O$.

16. A process for purifying at least a fraction of a solution in the Bayer cycle according to claim 14 characterised in that the sodium oxalate which is precipitated in the form of barium oxalate constitutes, in respect of one portion, the supersaturation destabilisation agent which is recycled to a fraction of the Bayer solution to be purified, the other portion of the barium oxalate constituting the discharge of the oxalate from the Bayer cycle.

17. A process for purifying at least a fraction of a solution in the Bayer cycle according to claim 16 characterised in that the portion of barium oxalate constituting the discharge from the Bayer cycle is treated to regenerate the barium aluminate in a known fashion.

18. A process for purifying at least a fraction of a solution in the Bayer cycle according to claim 14 characterised in that the temperature of dissolution of the sodium oxalate is at most equal to the boiling temperature.

19. A process for purifying at least a fraction of a solution in the Bayer cycle according to claim 14 characterised in that the volume of the water or the alkaline solution for dissolving the solid phase containing the precipitated sodium oxalate is from 50 to 500 liters.

20. A process for puriyfing at least a fraction of a solution in the Bayer cycle according to claim 14 characterised in that the sodium oxalate which is precipitated in the form of calcium oxalate constitutes the supersaturation destabilisation agent which is recycled to a fraction of Bayer solution to be purified.

21. A process for purifying at least a fraction of a solution in the Bayer cycle according to claim 14, wherein the temperature of dissolution of the sodium oxalate is from 70° to 90° C.

22. A process for purifying at least a fraction of a solution in the Bayer cycle according to claim 14, wherein the volume of the water or the alkaline solution for dissolving the solid phase containing the precipitated sodium oxalate is from 100 to 200 liters per tonne of alumina produced.

23. A process for purifying at least a fraction of a solution in the Bayer cycle according to claim 1, wherein said anionic synthetic polyelectrolyte is added to said aluminate solution subsequent to said step of separation of the red mud, and prior to said step of seeding with aluminum trihydroxide.

24. A process for purifying at least a fraction of a solution in the Bayer cycle according to claim 1 characterised in that an anionic synthetic polyelectrolyte with a high molecular mass $M > 10^4$ grams per mole is previously introduced into the solution of the Bayer cycle before the aluminium trihydroxide precipitation step.

25. A process for purifying at least a fraction of a solution in the Bayer cycle according to claims 1 or 5 characterised in that the previous addition of anionic synthetic polyelectrolyte to the solution of the Bayer cycle is effected in proportions by weight of between $5.10^{-5}$ and $10^{-3}$ reckoned with respect to the weight of caustic $Na_2O$ of the solution.

26. A process for purifying at least a fraction of a solution in the Bayer cycle according to claim 1 or 24, wherein the previous addition of anionic synthetic polyelectrolyte to the solution of the Bayer cycle is effected in proportions by weight of between $10^{-4}$ and $3 \times 10^{-4}$, reckoned with respect to the weight of caustic $Na_2O$ of the solution.

27. A process for purifying at least a fraction of a solution in the Bayer cycle according to claim 9, wherein the volume of the water or the alkaline solution for dissolving the solid phase containing the precipitated sodium oxalate is from 100 to 200 liters per tonne of alumina produced.

28. A process for purifying at least a fraction of a solution in the Bayer cycle according to claim 9 characterised in that the volume of the water or the alkaline solution for dissolving the solid phase containing the precipitated sodium oxalate is from 50 to 500 liters.

29. A process for purifying at least a fraction of a solution in the Bayer cycle according to claim 9 characterised in that the sodium oxalate which is precipitated in the form of calcium oxalate constitutes the supersaturation destabilisation agent which is recycled to a fraction of Bayer solution to be purified.

30. A process for purifying at least a fraction of a solution in the Bayer cycle according to claim 9 characterised in that the sodium oxalate which is precipitated in the form of barium oxalate constitutes, in respect of one portion, the supersaturation destabilisation agent which is recycled to a fraction of the Bayer solution to be purified, the other portion of the barium oxalate constituting the discharge of the oxalate from the Bayer cycle.

31. A process for purifying at least a fraction of a solution in the Bayer cycle according to claim 1 and 2, wherein the temperature at which the Bayer solution purification treatment is carried out is between 50° and 70° C.

* * * * *